United States Patent [19]

Ford, Jr.

[11] 4,071,190

[45] Jan. 31, 1978

[54] THERMOSTATIC VENT CONTROL

[76] Inventor: Edward B. Ford, Jr., 6405 Bardu Ave., Springfield, Va. 22152

[21] Appl. No.: 693,862

[22] Filed: June 8, 1976

[51] Int. Cl.² .......................................... G05D 23/275
[52] U.S. Cl. ............................... 236/93 A; 236/99 G
[58] Field of Search ............. 236/93 A, 1 G, 49, 99 G, 236/100, 99 F, 93 R, 95; 98/40 VT; 110/163; 126/290

[56] References Cited

U.S. PATENT DOCUMENTS 3,801,078  4/1974  Denton ................................. 236/93

FOREIGN PATENT DOCUMENTS 1,026,675  10/1950  France ................................ 236/93 A
613,443  11/1948  United Kingdom ............... 236/93 R Primary Examiner—William E. Wayner
Attorney, Agent, or Firm—Laurence R. Brown

[57] ABSTRACT

A thermostatically controlled damper is provided for an attic vent pipe having a single piece pivoted damper plate moved from substantially a horizontal to substantially a vertical position by a movable mechanism contacting the plate at an acute angle to both the open and closed plate positions.

5 Claims, 7 Drawing Figures

THERMOSTATIC VENT CONTROL

This invention relates to energy saving dampers used in conjunction with attic vent turbine assemblies, and more particularly it relates to thermostatic controlled automatic opening and closing attic vents.

BACKGROUND

Prior art damper controls for attic vent pipes are complex requiring complex parts and lever arrangements. This in part has been required since the amount of linear movement obtained from a thermostatic bellows or bimetal spring control is small as compared with the amount of movement of a flap damper valve in a 12" diameter pipe for example. It is well known that the simpler a device is the greater the reliability since a greater number of interrelated moving parts produce more places at which operation can fail.

OBJECTS OF THE INVENTION

It is therefore a general object of the invention to provide improved thermostatic attic vent damper controls.

A more specific object of the invention is to provide a simple reliable damper controls having few movable parts.

BRIEF DESCRIPTION OF THE INVENTION

A thermostatic bellows arrangement having relatively movable thrust tongues extending from both sides is used as a heat controlled motor drive for a one piece damper flap plate rotating about a horizontal pivot rod inside a vertically disposed attic vent pipe. One thrust tongue serves to move the damper flap from a substantially closed position caused by a weight positioned on the flap on one side of the axis so that it thereby permits the vent to be substantially closed by force of gravity when the bellows is compressed at lower temperatures. The tongue through a lever arm arrangement engages the flap near the pivot axis to open it to said substantially vertical position. The lever arm extends at an acute angle to the pivot axis and the lever arm is tilted at an acute angle toward the axis of the vent pipe to thereby provide amplified movement without further lever mechanisms to permit a small movement of the bellows as it expands to thereby move the damper flap from a substantially fully closed position to a substantially fully open position.

THE DRAWING

A preferred embodiment of the invention is set forth in the accompanying drawing, wherein.

DETAILED DESCRIPTION

Figure 1:
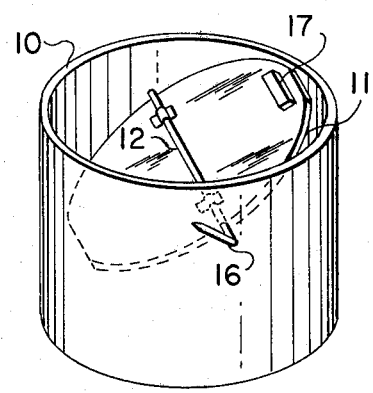
FIG. 1 is a perspective sketch of a vent pipe having therein a partly open thermostatically controlled damper assembly.
Figure 2:
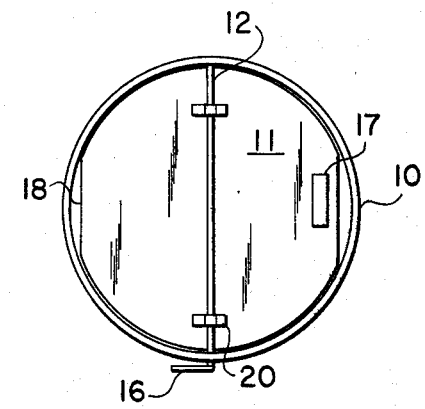
FIG. 2 is a top view of the assembly of FIG. 1 with the damper closed.

Referring now to the drawing, like reference characters represent similar features throughout the several views. As seen in the Figures, a vertically oriented vent pipe for an attic or the like 10 has a damper flap 11 pivoted therein about a pivot pin 12 mounted perpendicular to the vent pipe axis so that the flap 11 can be closed and opened by a thermostat control device 15. The pivot pin can have an external tip bent over to form an externally visible position indicating flap 16 which shows the internal orientation of the flap from outside pipe 10. A weight 17 is provided near the edge of the flap most remote from the pivot pin so that the flap will tend to occupy a closed position (FIG. 2) by force of gravity. Also this damps the movement of the flap so that it will not tend to vibrate and flutter. Suitable stops (not shown) may be mounted to limit movement so that the flap weight produces a closure torque when "fully" open. Thus, the fully open position may be at an angle of 10° or so off vertical.

The flap may have flattened outer edges 18 providing enough clearance in closed position to permit breathing through the pipe under conditions such as winter weather when condensation might otherwise occur in a closed attic.

The pivot pin 12 may be driven through bearing apertures in pipe 10 and be frictionally held in bulged indentations 20 formed in the generally flat plate of flap 11.

A simplified leverage arrangement for thermostatic motor control 15 is provided in the form of a U-channel type mounting bracket assembly 25 which may have opposing ends rivetted at 24 adjacent to the inner surface of pipe 10 at a position forming an acute angle 30 with the diametric line formed by the pivot pin 12. This mounting feature gives room for mounting a larger diameter bellows thermosat control member 15 without interference with movement of a single piece flap plate 11, and additionally places a movable lever arm 31 to have a bearing contact at the extremity bearing piece 32 which is close to the pivot axis 12. This produces amplified motion of the movement of flap plate 11 about the pivot axis.

If desirable the contact bearing piece 32 may have a "Teflon" sleeve or the arm 31 may be formed of plastic to reduce friction and wear with the flap place surface area engaged thereby.

In this way the movable tongue 26 of the bellows type thermostat 15 shown moves relative to the opposing integral tongue 27. This produces linear movement with temperature changes in a direction axial to the body of the bellows or the plane of the bracket 35 mounted on and below channel 25. A bolt-nut arrangement on tongue 27 holds the bellows in place on the bracket 35 as a force bearing surface.

Figure 3:
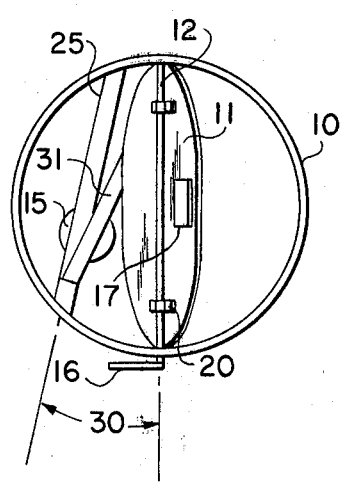
FIG. 3 is a top view of the assembly of FIG. 1 with the damper open.

Because of a limited degree of movement of tongue 26, it is mounted close to the pivot rod 36 of lever arm 31 in channel mount member 25. Movement of lever 31 fully opens the flap plate 11. The tongue 26 extends through aperture 40 in the channel bracket 25 to pivot the bearing end 32 of lever arm 31 upwardly in contact with the surface of flap plate 11 as may be seen from FIG. 3.

Figure 4:
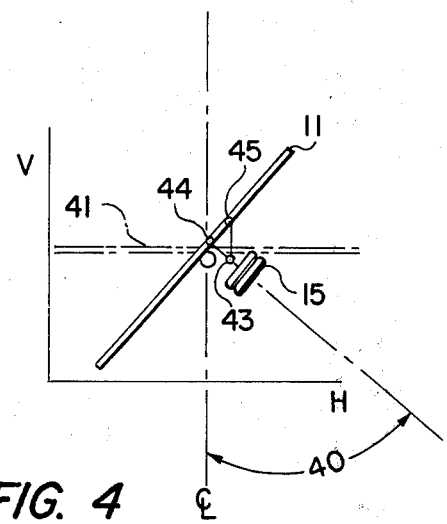
FIG. 4 is a graphical sketch illustrating a mechanical motion amplifying mechanism feature for thermostatic control of the damper.

In order to further amplify the movement the tongue 26 is mounted at an angle 40 to vertical by placing channel 25 at a tilt toward the flap plate pivot rod 12. This provides amplification of the bellows movement as seen from the graphical sketch of FIG. 4. Consider a movement imparted by bellows 15 to change flap 11 from horizontal 41 (phantom line) position to the partially open position shown relative to the pipe axis 42. It can be seen that the stroke of the operation mechanism 43-44 is smaller than the stroke from 43 to 45 would be if the tongue moved vertically in the pipe axis direction against the flap 11.

Figure 5:
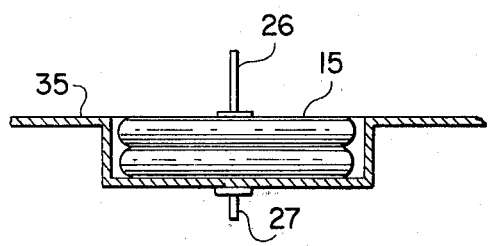
FIG. 5 shows a bellows-type thermostat as used in this invention with accompanying mounting bracket.
Figure 6:
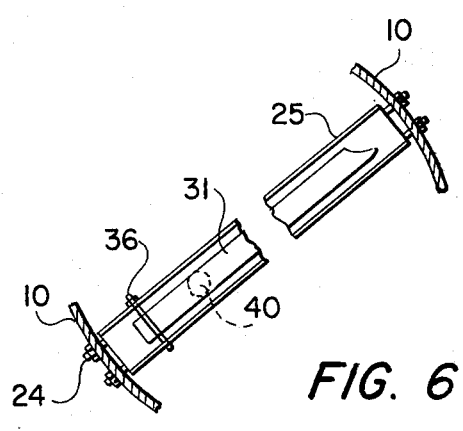
FIG. 6 shows a broken away top view of a control mechanism mounting embodiment.
Figure 7:
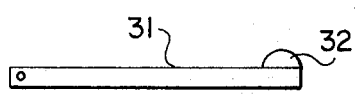
FIG. 7 shows a side view of a control lever arm.

Because of the one-piece bellows 15 construction as shown in FIG. 5, the only contact surfaces at which movement occurs are the simple pivots about pins 12, 36, the bellows tongue 26 contact against lever arm 31 and its resulting end tab 32 contact against flap plate 11.

Thus a very short bellows stroke provides compact and accurate leverage to move the flap between closed and opened position.

It is therefore seen that the damper control assembly operates automatically with a very simple and reliable mechanism that produces a wide range of damper movement for closing and opening even large size pipes such as 12" in diameter.

Accordingly, this invention has improved the state of the art and those novel features believed descriptive of the nature and spirit of the invention are defined with particularity in the appended claims.

What is claimed is:

1. Automatic thermostatically controlled damper means for a vent pipe comprising in combination, a flap plate substantially the same diameter as that of said pipe rotatable in said pipe about a pivot axis perpendicular to the axis of said pipe, a thermostat control device with a member movable above a predetermined temperature in an axial direction, mounting means positioning said control device inside said vent pipe to cause movement in the axial direction of said thermostat member to rotate said flap plate about said axis from a position substantially closing said pipe in a plane substantially perpendicular to the pipe axis to a position approaching a plane passed through the axis of the pipe, and structure in said mounting means holding the axial direction of movement of said control device disposed at a fixed acute angle with a plane passed through said pivot axis and including a lever member disposed to contact the thermostat movable member and said flap plate, wherein said actue angle is at an angle to a diametric line in said pipe formed by the pivot axis of said flap plate.

2. Damper means as defined in claim 1 wherein said movable member of said thermostat control device is disposed at an acute angle to a vertical plane passing through the axis of said pipe and the pivot axis of said flap plate.

3. Damper means as defined in claim 1 wherein said control device comprises an expandible bellows mechanism having integrally attached tongue members extending therefrom on opposite sides along said axial direction to provide one tongue member holding the bellows in place and another relatively movable as a function of temperature.

4. Damper means as defined in claim 1 wherein said mounting means comprises a linear U-channel shaped mounting member affixed at opposite ends to the interior walls of said pipe.

5. Damper means as defined in claim 4 wherein said lever member is a movable lever arm pivoted within said U-channel for movement in response to the movable member of said thermostat, said lever arm being held by said U-channel mounting member to move into contact with said flap plate at a position near said pivot axis thereby to move it between said two positions.

* * * * *